(12) United States Patent
Hepp et al.

(10) Patent No.: US 10,239,482 B2
(45) Date of Patent: *Mar. 26, 2019

(54) METHOD FOR FOLDING AN AIRBAG, AND AIRBAG MODULE

(71) Applicant: TRW AUTOMOTIVE SAFETY SYSTEMS GMBH & CO. KG, Aschaffenburg (DE)

(72) Inventors: Stefan Hepp, Glattbach (DE); Steffen Rothmeier, Goldbach (DE)

(73) Assignee: TRW AUTOMOTIVE SAFETY SYSTEMS GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,283

(22) Filed: Apr. 12, 2018

(65) Prior Publication Data

US 2018/0229686 A1 Aug. 16, 2018

Related U.S. Application Data

(63) Continuation-in-part of application No. 15/313,579, filed as application No. PCT/EP2015/001121 on Jun. 2, 2015, now Pat. No. 9,981,628.

(30) Foreign Application Priority Data

Jun. 2, 2014 (DE) .................... 10 2014 007 834

(51) Int. Cl.
*B60R 21/16* (2006.01)
*B60R 21/237* (2006.01)
(Continued)

(52) U.S. Cl.
CPC ........ *B60R 21/237* (2013.01); *B60R 21/2035* (2013.01); *B60R 21/2171* (2013.01); *B60R 21/264* (2013.01)

(58) Field of Classification Search
CPC .......................... B60R 21/203; B60R 21/237
(Continued)

(56) References Cited

U.S. PATENT DOCUMENTS 5,178,407 A   1/1993 Kelley
5,360,387 A   11/1994 Baker
(Continued)

FOREIGN PATENT DOCUMENTS

DE   19502744   3/1996
DE   10144776   4/2003

*Primary Examiner* — Toan C To
(74) *Attorney, Agent, or Firm* — Tarolli, Sundheim, Covell & Tummino LLP (57) ABSTRACT

A method for folding an airbag includes folding the airbag into an elongate state at least partially by roll-folding. The method also includes inserting a gas generator and/or an airbag-retaining metal sheet into the airbag. The gas generator and/or the airbag-retaining metal sheet is/are located in the central third of the airbag folded in elongate shape so that two end portions of the airbag project from the gas generator and/or from the airbag-retaining metal sheet. The method also includes guiding the airbag end portions around the outer circumference of the gas generator and/or of the airbag-retaining metal sheet in opposite directions toward each other up to a folding zone in which the end portions of the airbag at least almost contact each other. The method further includes folding over the end portions of the airbag from the folding zone outwards and guiding the airbag end portions in the opposite direction around the outer circumference of the gas generator and/or of the airbag-retaining metal sheet and around internal parts of the airbag end portions located thereon for forming external parts.

21 Claims, 7 Drawing Sheets

(51) Int. Cl.
*B60R 21/217* (2011.01)
*B60R 21/203* (2006.01)
*B60R 21/264* (2006.01)

(58) Field of Classification Search
USPC .......................................... 280/743.1, 743.2
See application file for complete search history.

(56) References Cited

U.S. PATENT DOCUMENTS

| | | | |
|---|---|---|---|
| 5,364,126 | A | 11/1994 | Kuretake et al. |
| 5,375,393 | A | 12/1994 | Baker et al. |
| 5,425,551 | A | 6/1995 | Hawthorn |
| 6,224,100 | B1 | 5/2001 | Kamano et al. |
| 6,250,675 | B1 | 6/2001 | Dietsch et al. |
| 6,286,866 | B1 | 9/2001 | Satge et al. |
| 6,341,800 | B1 * | 1/2002 | Pausch ................... B60R 21/237 280/728.1 |
| 6,739,622 | B2 | 5/2004 | Halford et al. |
| 6,918,868 | B2 | 7/2005 | Nishijima et al. |
| 7,125,044 | B2 * | 10/2006 | Nishijima ............. B60R 21/237 280/743.1 |
| 8,523,223 | B2 * | 9/2013 | Miyata .................. B60R 21/233 280/732 |
| 2001/0017460 | A1 | 8/2001 | Igawa |
| 2004/0183290 | A1 * | 9/2004 | Hasebe ............ B60R 21/01508 280/735 |
| 2005/0269807 | A1 * | 12/2005 | Jenkins ................ B60R 21/201 280/731 |
| 2006/0175818 | A1 | 8/2006 | Thomas |
| 2007/0096448 | A1 | 5/2007 | Yokoyama et al. |
| 2011/0127756 | A1 | 6/2011 | Buchholz et al. |
| 2013/0320655 | A1 * | 12/2013 | Takagi .................. B60R 21/237 280/743.1 |

* cited by examiner

METHOD FOR FOLDING AN AIRBAG, AND AIRBAG MODULE

RELATED APPLICATIONS

This application is a continuation-in-part of U.S. application Ser. No. 15/313,579, filed on Nov. 23, 2016, which corresponds to PCT/EP2015/001121, filed Jun. 2, 2015, which claims the benefit of German Application No. 10 2014 007 834.5, filed Jun. 2, 2014, the subject matter of which are incorporated herein by reference in their entireties.

BACKGROUND OF THE INVENTION

The invention relates to a method for folding an airbag as well as to an airbag module comprising a gas generator and an airbag in which the gas generator is located.

The folding of an airbag is an extremely demanding technique, as folding has a significant influence on the later unfolding operation, because the folding itself has to be perfectly reproducible so as to minimize the tolerances in positioning the folds and the airbag and because the folding also has to be carried out in an economical manner.

In particular for folding steering wheel airbags there are most various variants. For example, DE 101 44 776 C2 describes a method in which the steering wheel airbag is first zigzag folded so that an elongate airbag package is resulting which is then folded over inwards with its ends, namely ahead of the gas generator and consequently in the vicinity of the deployment opening in the airbag module.

From DE 195 02 744 C1 likewise a method for folding a steering wheel airbag is known in which the airbag is folded into an elongate package by parallel zigzag folding, wherein the gas generator is located in the middle of said package. Each of the two ends of the elongate package is folded in wave shape in opposite directions and then is forced from outside radially in the direction of the gas generator.

SUMMARY OF THE INVENTION

It is the object of the invention to provide an alternative folding behavior which produces an airbag to be accommodated in a very space-saving manner which offers excellent deployment properties and above all can be folded very easily and quickly.

The method according to the invention provides the following steps of:
 folding the airbag into an elongate state at least partially by roll-folding,
 inserting a gas generator and/or an airbag-retaining metal sheet into the airbag, wherein the gas generator and/or the airbag-retaining metal sheet is/are located in the central third of the airbag folded in elongate shape so that two end portions of the airbag project from the gas generator and/or from the airbag-retaining metal sheet,
 guiding the airbag end portions around the outer circumference of the gas generator and/or of the airbag-retaining metal sheet in opposite directions toward each other up to a folding zone in which the end portions of the airbag at least almost contact each other, and
 folding over the end portions of the airbag from the folding zone outwards and guiding the airbag end portions in the opposite direction around the outer circumference of the gas generator and/or of the airbag-retaining metal sheet and around internal parts of the airbag end portions located thereon for forming external parts.

The method according to the invention enables the airbag to be laid very closely against the outer circumference of the gas generator on the outside by means of two large superimposed parts of each end portion of the airbag each extending by almost 180° in the circumferential direction. That is to say, the at least partially roll-folded elongate airbag package subsequently is not frequently folded once again but extends in curved shape around the gas generator or the airbag-retaining metal sheet so as to be then folded once outwards instead of inwards as in prior art. Hence also the space along the outer circumference of the gas generator is exploited almost in its entirety as an accommodation space for the airbag package.

Preferably the external parts of the airbag end portions should be folded over so far that the ends thereof contact each other. This, too, is carried out with respect to preferably exploiting the distance around the airbag.

Moreover it may be provided to position the gas generator in step b) within the airbag so that transversely to the longitudinal extension of the at least partially roll-folded airbag folds extend on opposite circumferential sides of the gas generator along the gas generator. In this intermediate state of the folding process the elongate airbag package is quasi divided towards its center into two package portions. Whereas the end portions of the airbag are located at 3 o'clock and at 9 o'clock relative to the centrally arranged gas generator, for example, the splitting package portions extend in the center on the one hand at 6 o'clock and on the other hand at 12 o'clock along the gas generator and/or of the airbag-retaining metal sheet.

The airbag package itself can be folded, on the one hand, in a more reproducible manner and, on the other hand, in a more space-saving manner, when the airbag is thermally heated and/or compressed for creating the folds. When the airbag is heated and compressed, a so-called thermofixed pre-folding occurs which forms an intermediate state of the airbag.

An embodiment of the invention provides that the gas generator is essentially cylindrical end the folds are laid along the outer circumference of the gas generator.

In particular, the airbag module in question is a steering wheel module.

The airbag may be folded and accommodated in a cup-shaped module casing.

The folded portions of the airbag can extend in a peripheral gap between the outer circumferential wall of the module casing and the outer circumference of the gas generator.

At least a part, preferably a majority of the end face of the gas generator is covered only by one airbag layer in the deployment direction. This means that, on the end face toward the exiting direction of the airbag, the gas generator is neither completely nor in large part covered by the airbag package. In this central area relatively little resistance is offered to the gas during deployment which ensures rapid deployment in the central area of the airbag.

As an option it may be provided that from the internal part of each of the two airbag end portions a folding bead projecting in a jaw-like manner, i.e. a segment of the airbag package, protrudes from the end face of the gas generator.

According to one example implementation, the folds of the airbag can be formed in upper and lower airbag portions. In this implementation, folds of at least one of the upper and lower airbag portions can have a forward roll-folded configuration. Additionally or alternatively, folds of at least one of the upper and lower airbag portions can have a rearward roll-folded configuration. In one particular example implementation, one of the upper and lower airbag portions can have a forward roll-folded configuration and the other of the upper and lower airbag portions can have a rearward roll-folded configuration. In a further example implementation, one of the upper and lower airbag portions can have a zigzag folded configuration and the other of the upper and lower airbag portions can have a roll-folded configuration.

One advantage of the folding can be that the folding can be appropriately adapted to the module environment (interior geometry) so as to permit optimum deployment, especially for in-and-out-of-position load cases. One particular advantage of the folding can be that the folding can allow for renouncing two-stage pyrotechnical airbag gas generators in some applications for the protection in so-called out-of-position situations.

Another advantage of the folding technique according to the invention can be an excellent and rapid deployment characteristic of the airbag between the lower steering wheel rim and the abdomen of the driver which offers a further improvement as compared to random folding. This can be especially effective in vehicle situations in which a small occupant (e.g., the so-called 5% woman) is seated close to the steering wheel.

A further advantage of the folding technique according to the invention can be an excellent and rapid deployment characteristic of the airbag behind the upper steering wheel rim, which offers a further improvement as compared to random folding. This can be especially effective in vehicle situations in which any occupant, such as an out-of-position occupant, is seated with their head close to the upper steering wheel rim.

Moreover the invention also relates to an airbag module comprising a gas generator and an airbag in which the gas generator is located. The airbag is laid into plural folds, at least a portion of which are roll-folded, extending in parallel to each other so as to form an elongate package in an intermediate state. The gas generator is located in the central third of the elongate package, wherein starting from the central third end portions of the airbag of the package are folded into at least two package layers, hereinafter referred to as parts, wherein the two inner package layers (parts) extend along the outer circumference of the gas generator toward each other up to a folding zone and then, when folded over outwards, extend along the respective inner package layer in the opposite direction. The two end portions of the airbag thus are laid along the outer circumference of the airbag so as to form an internal part. The end portions of the airbag then are folded over outwards so as to provide an external part adjacent to the internal part of the package.

According to one example implementation, the folds of the airbag can be formed in upper and lower airbag portions. In this implementation, folds of at least one of the upper and lower airbag portions can have a forward roll-folded configuration. Additionally or alternatively, folds of at least one of the upper and lower airbag portions can have a rearward roll-folded configuration. In one particular example implementation, one of the upper and lower airbag portions can have a forward roll-folded configuration and the other of the upper and lower airbag portions can have a rearward roll-folded configuration. In a further example implementation, one of the upper and lower airbag portions can have a zigzag folded configuration and the other of the upper and lower airbag portions can have a roll-folded configuration.

One advantage of the folding can be that the folding can be appropriately adapted to the module environment (interior geometry) so as to permit optimum deployment, especially for in-and-out-of-position load cases. One particular advantage of the folding can be that the folding can allow for renouncing two-stage pyrotechnical airbag gas generators in some applications for the protection in so-called out-of-position situations.

Another advantage of the folding technique according to the invention can be an excellent and rapid deployment characteristic of the airbag between the lower steering wheel rim and the abdomen of the driver which offers a further improvement as compared to random folding. This can be especially effective in vehicle situations in which a small occupant (e.g., the so-called 5% woman) is seated close to the steering wheel.

A further advantage of the folding technique according to the invention can be an excellent and rapid deployment characteristic of the airbag behind the upper steering wheel rim, which offers a further improvement as compared to random folding. This can be especially effective in vehicle situations in which any occupant, such as an out-of-position occupant, is seated with their head close to the upper steering wheel rim.

The airbag end portions may contact each other in the folding zone and/or at their ends.

The gas generator can be cylindrical and the folds can extend along the outer circumference of the gas generator.

The airbag may include folds in the central third extending along opposite circumferential sides of the gas generator.

BRIEF DESCRIPTION OF THE DRAWINGS

An embodiment of the invention shall be illustrated in the following drawings, in which.

DESCRIPTION

Figure 1:
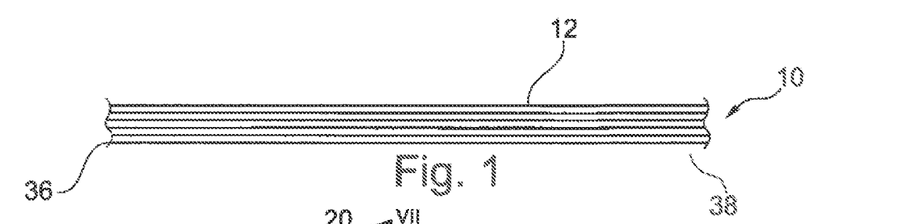
FIG. 1 shows a first step of the method for folding an airbag.

FIG. 1 illustrates an airbag 10 in the form of a steering wheel airbag pro-folded in zigzag shape and comprising numerous folds 12 extending in parallel to each other.

Said folding of the airbag 10 into an elongate airbag package shown in FIG. 1 is performed, for instance, by a so-called thermofixed pre-folding in which the airbag 10 is compressed into plural Z-shaped folds while simultaneously heat is supplied. A concertina-like structure is resulting.

The airbag includes a so-called injection mouth, i.e. an opening disposed in its central third related to the elongate package in FIG. 1.

After the folding according to FIG. 1, either the gas generator 14, in this case a cylindrical gas generator 14, and/or a retaining metal sheet for the gas generator 14 is/are inserted through said opening.

The retaining metal sheet equally takes the shape shown in FIG. 2 and during the folding process possibly also serves as a placeholder for the space later occupied by the gas generator 14. After inserting the gas generator 14 or the corresponding retaining metal sheet, the airbag package adopts the structure shown in FIG. 2 including two end portions 16, 18 of the airbag pointing in two opposite directions related to the gas generator 14 or the retaining metal sheet in which the package maintains the shape as shown in FIG. 1 and including a central portion in which the airbag package splits into two parts 20, 22 extending along opposite circumferential sides of the gas generator 14 or of the retaining metal sheet in close contact with the same.

Figure 2:
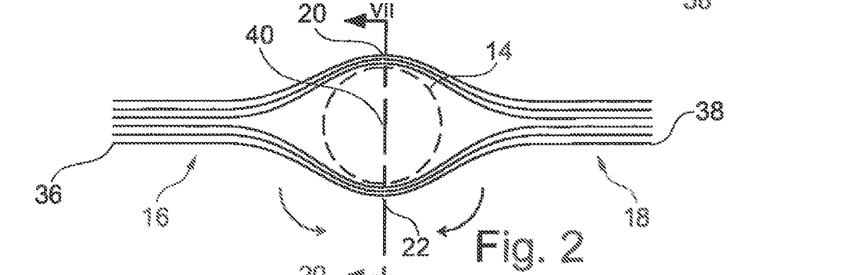
FIG. 2 shows a second step for folding the airbag.

In a subsequent step the two end portions 16, 18 of the airbag are guided, as illustrated in FIG. 2 by the arrows, in opposite circumferential directions and toward each other around the outer circumference of the gas generator 14 and/or of the retaining metal sheet so that the respective portions extend in close contact with the outer circumference. This guiding around then results in the intermediate state shown in FIG. 3.

Figure 3:
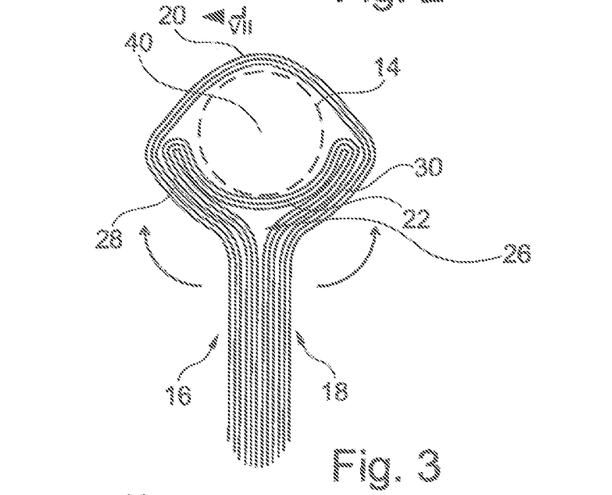
FIG. 3 shows a third step for folding the airbag.

The end portions 16, 18 extending toward each other then will contact each other or approximately contact each other in a so-called folding zone 26 located at half the peripheral distance between the two end portions 16, 18 of the airbag related to FIG. 3 at approximately 6 o'clock.

In said folding zone 26 the end portions 16, 18 of the airbag are folded over, as shown by the arrow direction in FIG. 3, outwardly and in the opposite direction again and in turn are laid against the already existing package from outside. The state shown in FIG. 4 is resulting.

Up to the folding zone 26 thus an internal part 28, 30 of the respective airbag end portion 16 and, resp., 18 is resulting. After folding over outwards, respective external pads 32 and, resp., 34 of the corresponding end portion 16, 18 of the airbag are laid along said internal part 28, 30. Optionally the ends 36 and 38, resp., of the airbag end portions 16 and, resp., 18 then may contact each other. This is not absolutely necessary, however.

Figure 4:
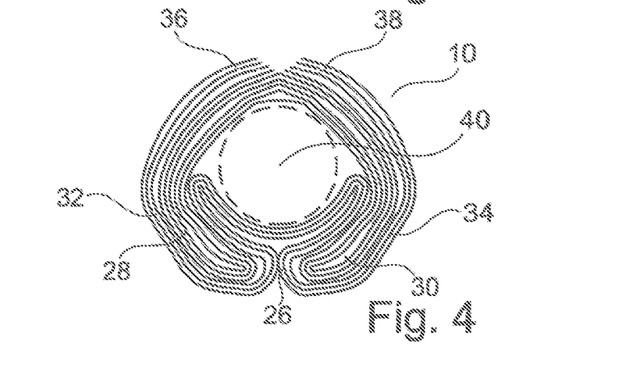
FIG. 4 shows the airbag folded in a top view, drawn without an airbag module.

As can be inferred from FIG. 4, the folded part of the airbag 10 extends along the outer circumference of the gas generator 14. That is to say, it is not laid or folded onto the end face 40 of the gas generator 14 facing the deployment direction (from the plane of projection). This area above the end face 40 remains completely or largely free from the folded package of the airbag 10 so that only one layer of the airbag 10 extends over the end face 40.

As regards the drawings, it is mentioned that the folds in practice extend by far more closely to each other as a matter of course; they are shown at a definite distance from each other in the Figures for graphical and illustrative reasons only.

Figure 5:
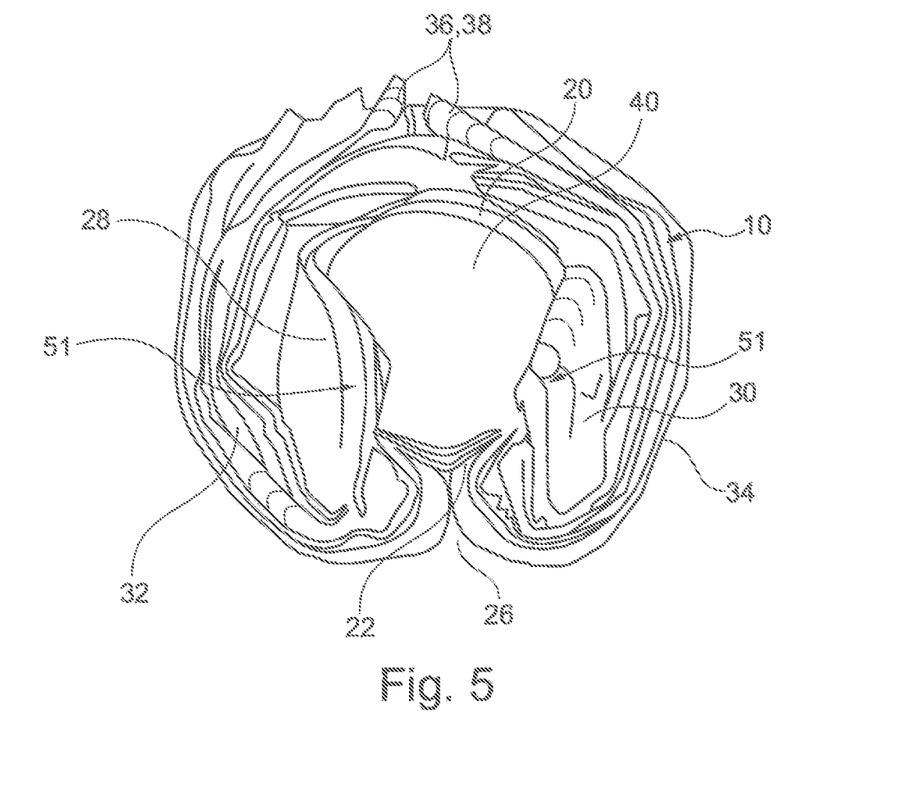
FIG. 5 shows a top view of a further embodiment of an airbag folded.

In the embodiment according to FIG. 5 jaw-like folding beads 51 projecting radially inwardly and protruding from a part of the end face 40 of the gas generator are shown. Said folding beads 51 are portions of the internal part 28, 30 of the end portions 16 and 18, resp., of the airbag. As is illustrated in FIG. 5, however, the majority of the end face 40 of the gas generator 14 is still covered by one layer only and is not covered by the airbag package.

Figure 6:
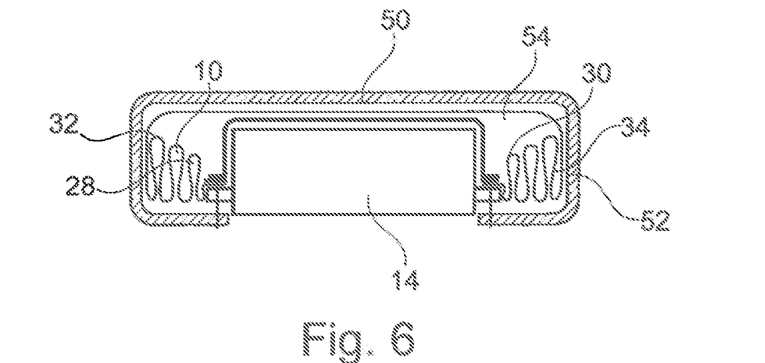
FIG. 6 shows a sectional view across an airbag module.

FIG. 6 illustrates a section across an airbag module according to the invention in which the airbag 10 presented in the afore-described Figures surrounds the gas generator 14. Moreover the airbag module includes a module casing 50 having an outer peripheral wall 52. As is evident from FIG. 6, between the outer circumference of the gas generator 14 and the outer peripheral wall 52 a circumferential gap 64 is formed into which the airbag is folded or, resp., in which the folded airbag extends.

Also, in FIG. 6 it is especially clearly visible that according to a preferred embodiment shown here the individual folding heights of the zigzag-folded airbag layers are designed to be of different height. (When speaking of the height of the folds, it has to be considered or measured in the direction of a central or symmetry axis of the gas generator 14, viz. perpendicularly to the end face 40 thereof). Preferably, a further inwardly located fold 28, 30 (to be arranged more closely to the gas generator 14) is designed to have a smaller height than a further outwardly located fold 32, 34 (to be arranged more distant from the gas generator). A minimum fold height is preferred to be designed smaller than half the height (or than ⅔ of the height) of the gas generator or of the folded airbag package. In this way, gas may flow out of the outlet orifices of the gas generator over the heads of the folds to the inside of the portion of the airbag package facing the driver and inflate the airbag in a primary inflating operation more quickly toward the driver, before the deployment toward the side takes place. In addition, it is preferred that a maximum fold height is designed larger than half the height of the gas generator or of the folded airbag package, especially approximately or (except a thickness of one to five times the material thickness of the airbag material) exactly as high as the height of the gas generator or of the folded airbag package. Accordingly, a minimum fold height is preferred to be designed less than 30 mm, preferably less than 20 mm. In addition, a maximum fold height is preferred to be designed higher than 35 mm, preferably higher than 50 mm, further preferred higher than 70 mm. It is especially preferred that the height of the folds increases from the inside to the outside (from the gas generator 14 toward the module edge). In this way the afore-described effect is even increased.

As a matter of course, this embodiment of the folding increasing toward the outside is or can be configured especially (or only) for the innermost folding packages or folding package portions 20, 22 (located closest to the gas generator 14) (FIG. 2, 3). In the outer or re-folded portions 16, 18 then preferably an alternately decreasing and increasing contour of the folding heights (in V or W shape) is formed. However, this does not affect the afore-described effect.

Alternative configurations are illustrated in FIGS. 7A-7D. In these Figures, reference numbers identical to those used in FIGS. 1-6 are used to identify similar or identical structures. More specifically, in FIGS. 7A-7D, the components of the airbag module can be identical to those illustrated and described herein with reference to FIGS. 1-6. The only difference distinguishing the airbag module configurations of FIGS. 7A-7D from those of FIGS. 1-6 is that the folding methods used to place the airbag 10 in the condition of FIG. 2 are different. In particular, the airbag is laid into parallel folds extending in parallel to each other as described above. However, in contrast to the embodiment according to FIGS. 1-6, the parallel folds are not exclusively formed by zigzag-folding but, at least partially, by roll-folding. All of the other steps in the folding method and the resulting airbag module configuration can be identical.

The airbag modules of FIGS. 7A-7D each include an airbag 10 and a gas generator 14 for providing inflation fluid for inflating the airbag. An airbag retaining metal sheet 15, e.g., in the form of a diffusor, is fitted over the gas generator 14. The configuration of the gas generator 14 and diffusor 15 in FIGS. 7A-7D is for purposes of illustration only and is not meant to limit or restrict the configuration of the airbag module. The airbag module can include gas generators and/or diffusors having alternative configurations.

The airbags 10 of FIGS. 7A-7D are folded, especially at least partly roll-folded in a manner configured to adapt appropriately to the module environment so as to permit optimum deployment, especially in the case of in-and-out-of-position load cases.

Advantageously, as with the other embodiments, this can help eliminate the need for a two-stage gas generator for occupant protection in the event of an out-of-position scenario. As another advantage, the folding technique can facilitate rapid deployment characteristics of the airbag between the lower steering wheel rim and the abdomen of the driver which offers a further improvement as compared to random folding. This is especially effective in vehicle situations in which the occupant is seated close to the steering wheel (e.g., the so-called 5% woman).

FIGS. 7A-7D illustrate a section (see line VII-VII in FIG. 2) across an airbag module according to the invention in which the airbag 10 surrounds the gas generator 14, leaving a single layer of airbag material overlying the end face 40 of the gas generator. In FIGS. 7A-7D, the vehicle steering wheel 70 is shown for context. The steering wheel 70 (see also, FIG. 8) is a conventional structure including a central hub 72, an outer rim 74 surrounding the hub, and spokes 76 that extend between and connect the hub to the rim. The airbag module is supported in the hub 72, with the module casing 50 forming the surface of the hub.

Although it can be inferred from the description herein above in conjunction with the drawings, an upward direction in the vehicle is indicated generally by the arrow labeled "U" in FIGS. 7A-7D. A downward direction in the vehicle is indicated generally by the arrow labeled "D" in FIGS. 7A-7D. A forward, front of the vehicle direction is indicated generally by the arrow labeled "F" in FIGS. 7A-7D. A rearward, rear of the vehicle direction is indicated generally by the arrow labeled "R" in FIGS. 7A-7D. The central or symmetry axis of the gas generator 14, extends perpendicular to the end face 40 of the gas generator 14 in a direction generally, but not necessarily parallel to, the forward-rearward direction.

In the configurations of FIGS. 7A-7D, at least one of the upper and lower package portions 20 and 22, respectively, of the airbag 10 are roll-folded. These differences have an impact on how the airbag 10 will deploy. In FIGS. 7A-7D, the folded upper and lower package portions 20, 22 are illustrated as being loosely folded. This is for purposes of illustration only. It should be understood and appreciated that the package portions 20, 22 will be more tightly folded. The airbag 10 can, for example, be folded by a so-called thermofixed pre-folding in which the airbag 10 is compressed into plural folds while simultaneously heat is supplied in order to produce the folded structure.

Figure 7A:
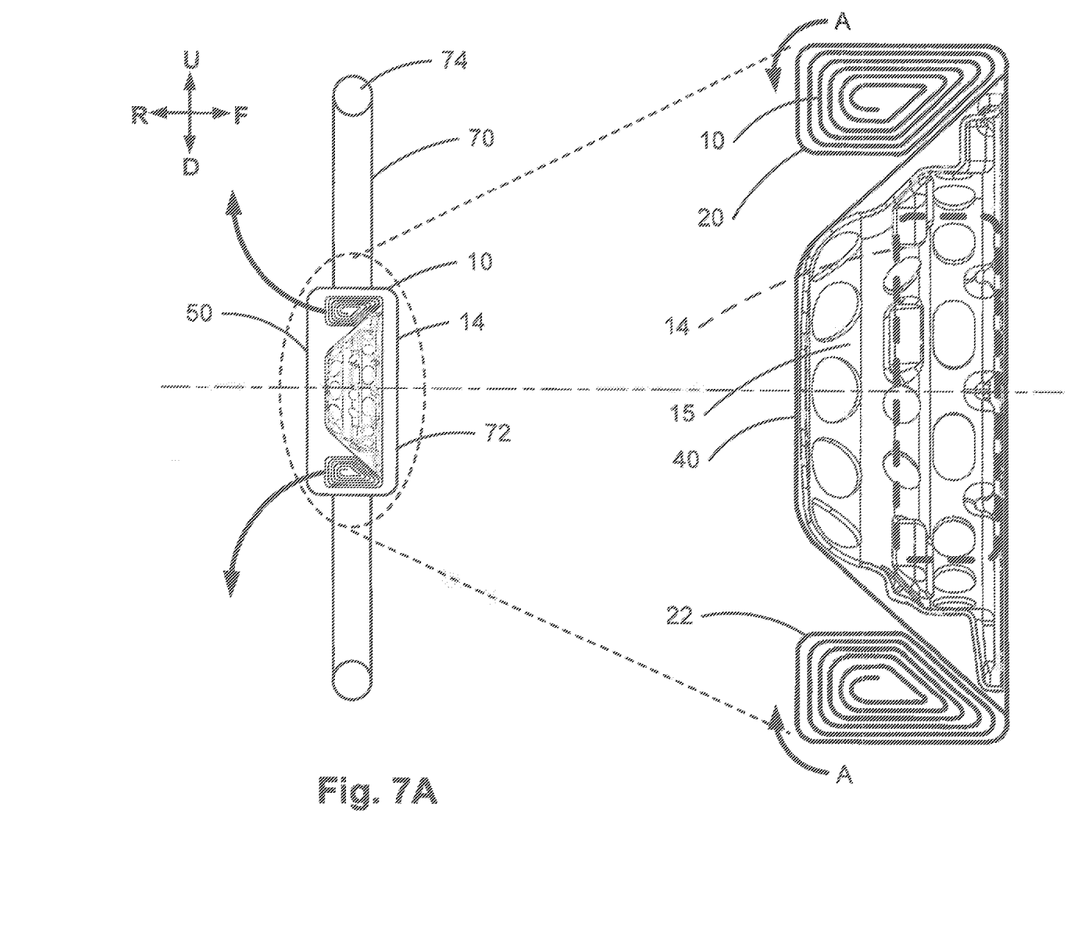
FIGS. 7A-7D illustrate steps for folding the airbag according to alternative configurations of an airbag module.

In the configuration of FIG. 7A, the upper and lower portions 20, 22 are roll-folded in a rearward direction as indicated generally by the curved arrows labeled "A" in FIG. 7A. By "rearward," it is meant that the upper and lower portions are roll-folded, beginning with the outer edge of each portion, in a direction that is initially in the rearward direction (arrow R), i.e., to the left as viewed in FIG. 7A, and inward toward the central axis. This initial roll-fold is continued in this rearward direction until the upper and lower portions are roll-folded as shown in FIG. 7A.

Figure 7B:
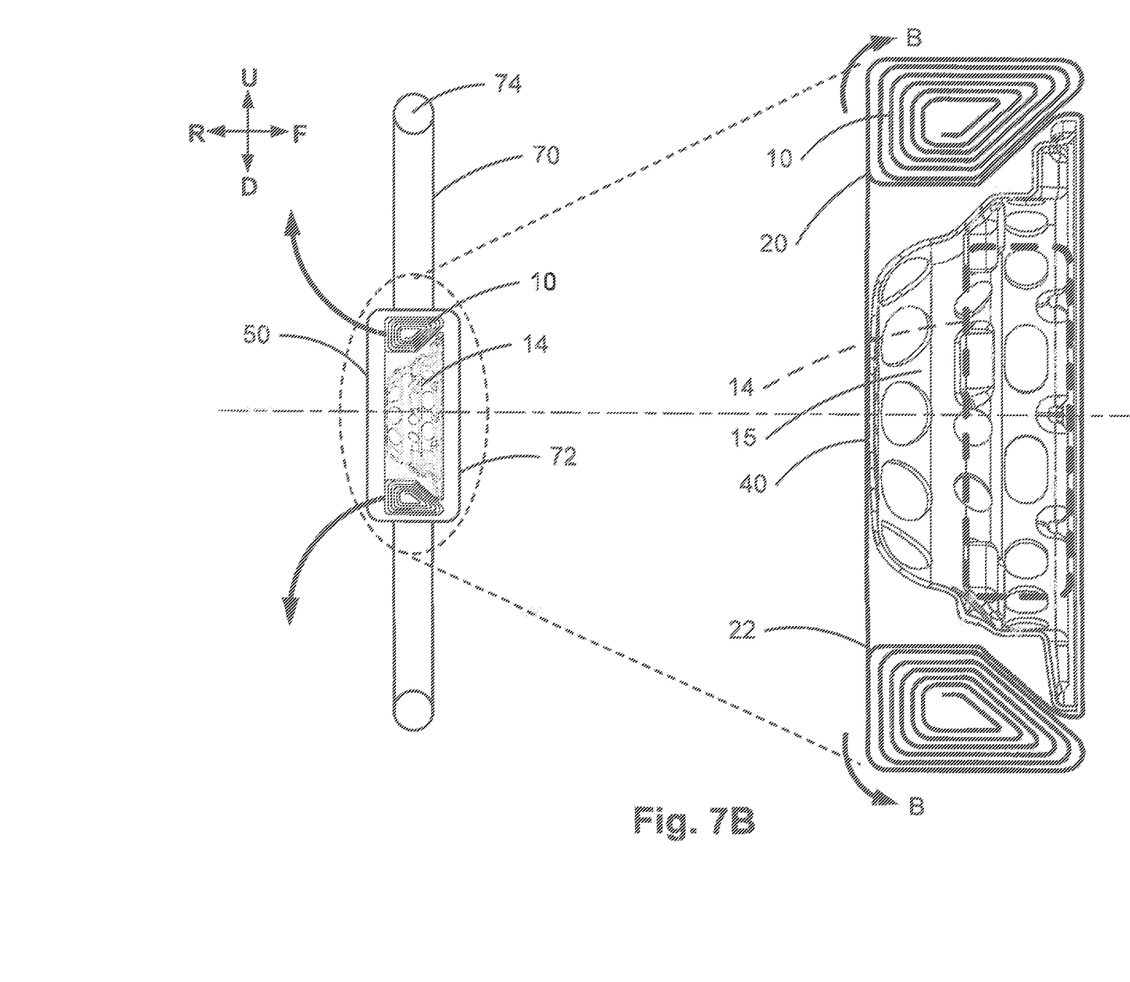

In the configuration of FIG. 7B, the upper and lower portions 20, 22 are roll-folded in an forward direction as indicated generally by the curved arrows labeled "B" in FIG. 7B. By "forward," it is meant that the upper and lower portions are roll-folded, beginning with the outer edge of each portion. In a direction that is initially in the forward direction (arrow F), i.e., to the right as viewed in FIG. 7B, and inward toward the central axis. This initial roll-fold is continued in this direction until the upper and lower portions are roll-folded as shown in FIG. 7B.

In the configuration of FIG. 10, the upper and lower portions 20, 22 are roll-folded in opposite directions, one in a rearward direction identical to that shown in FIG. 7A, and one in an forward direction identical to that shown in FIG. 7B. In the example configuration of FIG. 10, the upper portion 20 is roll-folded in the rearward direction and the lower portion 22 is roll-folded in the forward direction. The roll-fold directions in this configuration could, however, be reversed, i.e., the upper portion 20 can be roll-folded forward and the lower portion 22 can be roll-folded rearward.

Figure 7C:
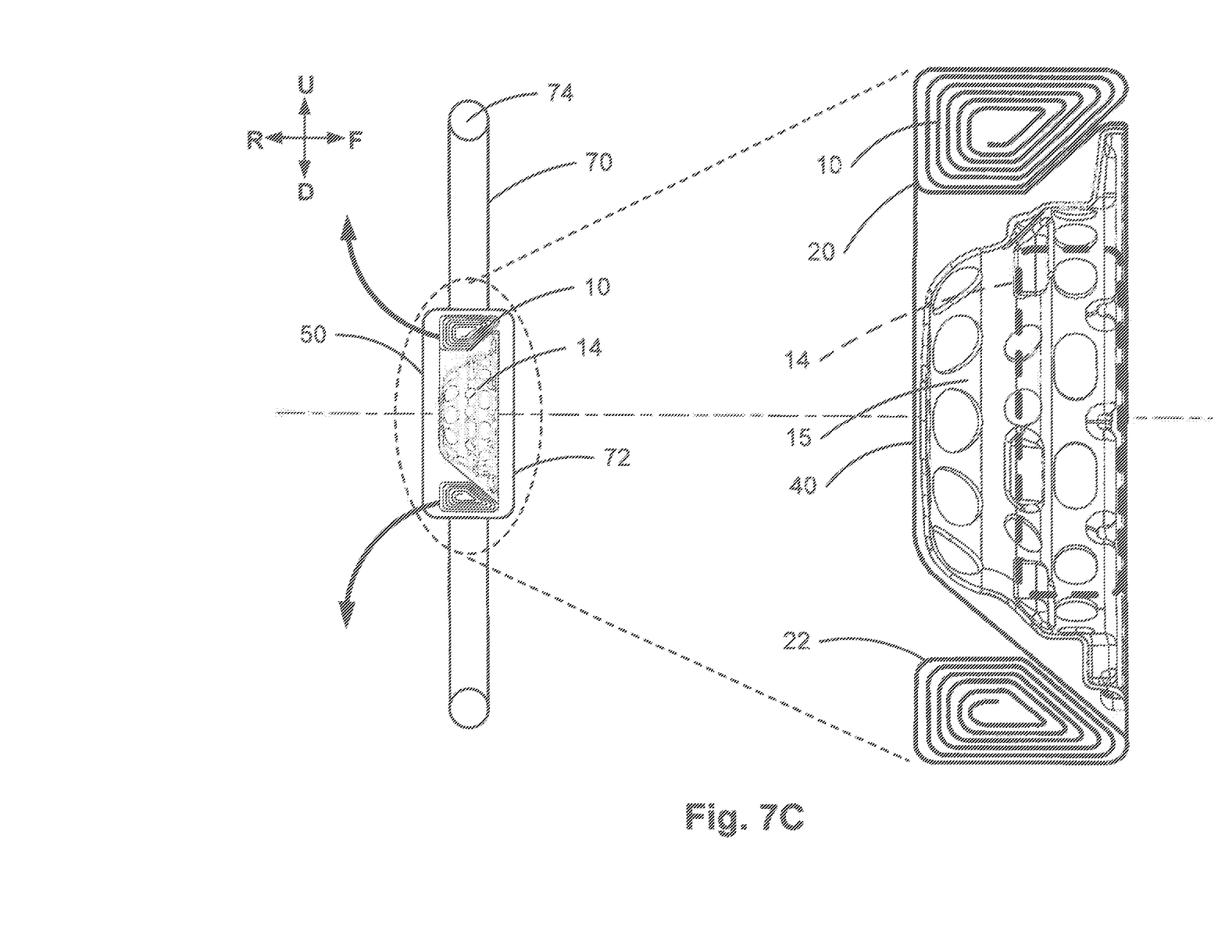
Figure 7D:
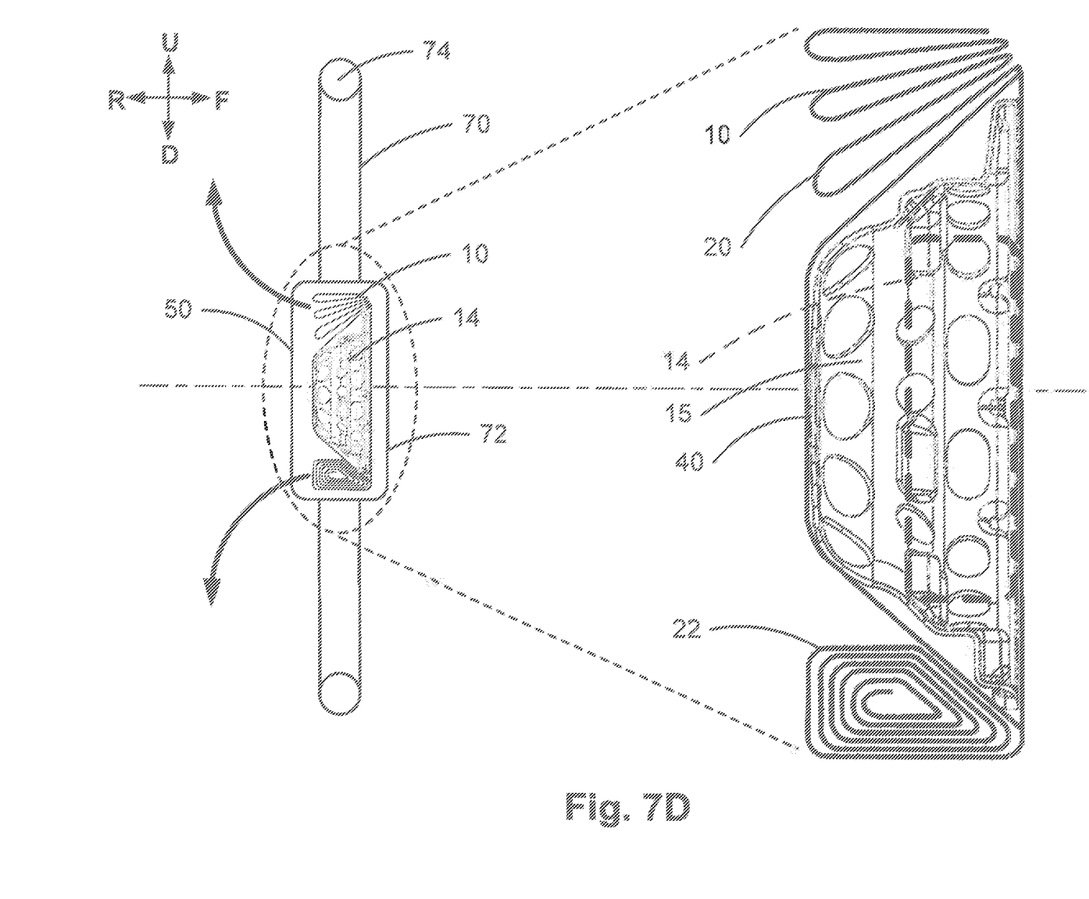

In the configuration of FIG. 7D, one of the upper and lower portions 20, 22 is roll-folded, and the other of the upper and lower portions is zigzag folded. In the example configuration of FIG. 7D, the upper portion 20 is zigzag folded and the lower portion 22 is roll-folded in the rearward direction. The roll types in this configuration could, however, be reversed, i.e., the upper portion 20 can be roll-folded and the lower portion 22 can be zigzag folded. Additionally, the roll-folded portion in this configuration can be folded in either a forward or rearward direction.

Figure 8:
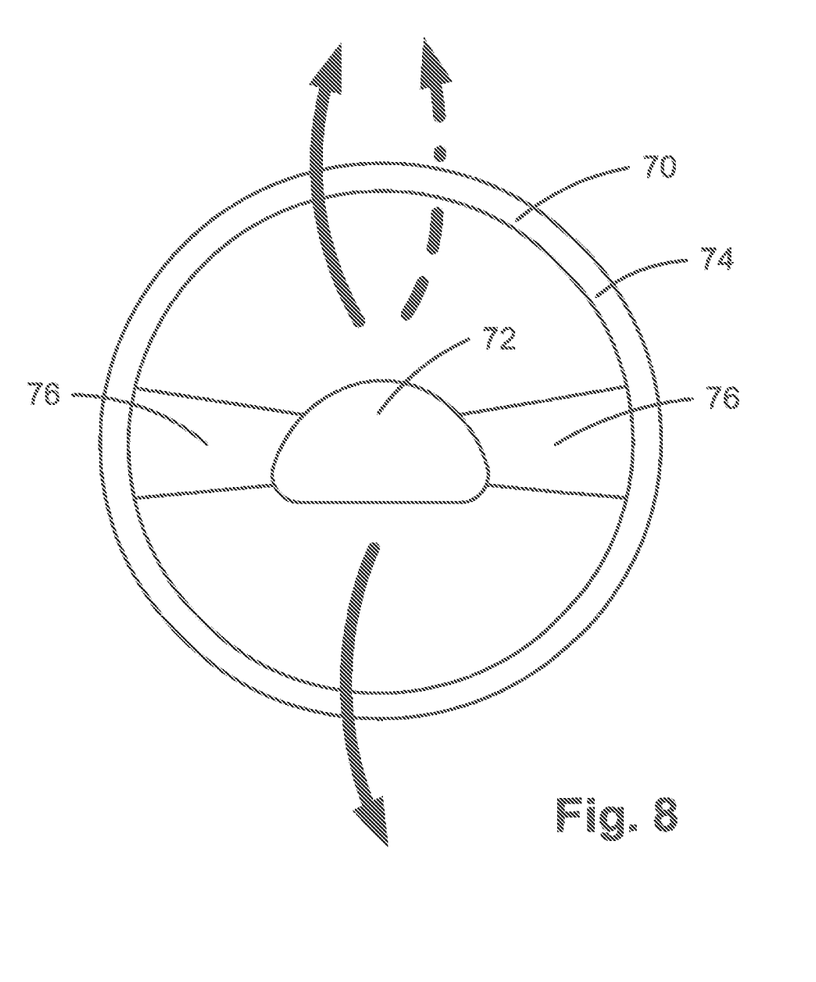
FIG. 8 shows a steering wheel in which the airbag module can be implemented.

Referring to FIG. 8, the desired deployment of the upper and lower portions 20, 22 of the airbag 10 under normal situations are illustrated by solid arrows. According to this desired deployment, the upper and lower portions 20, 22, when deployed, are positioned between the upper and lower portions, respectively, of the steering wheel rim 74 and an occupant.

One of the out-of-position load cases that can occur is where the occupant is seated close to the steering wheel. As shown by the dashed arrow in FIG. 8, where the occupant is in this out-of-position load scenario, it can be desirable for the upper portion 20 of the airbag 10 to deploy behind the steering wheel rim 74, i.e., the steering wheel rim 74 positioned between the upper portion 20 of the airbag 10 and the occupant. This can be desirable to avoid severe impacts between the occupant's head and the deploying upper portion 20 of the airbag 10.

An advantage that can be realized through the airbag folding arrangements and methods disclosed herein is that both the upper and lower portions 20, 22 of the airbag 10 can be configured to deploy between the steering wheel rim 74 and the occupant in the normal situations. In the out-of-position scenario, the upper portion 20 of the airbag 10 can be configured to deploy behind the steering wheel rim 74 so as to avoid impacting the occupant.

For example, in FIGS. 7B and 7C, the upper portion 20 of the airbag 10 has the forward roll-folded configuration. When the upper portion 20 deploys, it will unfold in a rearward direction, i.e., clockwise as viewed in FIGS. 7B and 7C. If the out-of-position occupant's head or body happens to be positioned close to the steering wheel 70 at the time of deployment, the counterclockwise unfold direction will cause the upper portion 20 of the airbag 10 to "roll" along the occupant. This allows the deployment trajectory of the airbag 10 to be redirected through the space between the steering wheel rim 74 and hub 72, above the spokes 78 and become located behind the rim. The alternative would be for the deploying upper portion 20 to move the occupant in order to be positioned between the steering wheel rim 74 and the occupant.

As another example, in FIG. 7D, the upper portion 20 of the airbag 10 has the zigzag folded configuration. The zigzag folded upper portion 20 performs in a manner similar to that of the forward roll-folded portion described above in that its unfolding allows the closely positioned occupant to redirect its deployment trajectory. As a result, the zigzag folded upper portion can deploy between the rim and the out-of-position occupant.

The foregoing description and examples have been set forth merely to illustrate the invention and are not intended as being limiting. Each of the disclosed aspects and embodiments of the present invention may be considered individually or in combination with other aspects, embodiments, example configurations, and variations of the invention. Further, while certain features of embodiments and example configurations of the present invention may be shown in only certain figures, such features can be incorporated into other embodiments shown in other figures while remaining within the scope of the present invention. In addition, unless otherwise specified, none of the steps of the methods of the present invention are confined to any particular order of performance. Modifications of the disclosed embodiments incorporating the spirit and substance of the invention may occur to persons skilled in the art and such modifications are within the scope of the present invention.

We claim:

1. A method for folding an airbag comprising the following steps of:
   folding the airbag into an elongate state at least partially by roll-folding,
   inserting a gas generator and/or an airbag-retaining metal sheet into the airbag, wherein the gas generator and/or the airbag-retaining metal sheet is/are located in the central third of the airbag folded in elongate shape so that two end portions of the airbag project from the gas generator and/or from the airbag-retaining metal sheet,
   guiding the airbag end portions around the outer circumference of the gas generator and/or of the airbag-retaining metal sheet in opposite directions toward each other up to a folding zone in which the end portions of the airbag at least almost contact each other, and
   folding over the end portions of the airbag from the folding zone outwards and guiding the airbag end portions in the opposite direction around the outer circumference of the gas generator and/or of the airbag-retaining metal sheet and around internal parts of the airbag end portions located thereon for forming external parts.

2. The method according to claim 1, wherein the external parts of the end portions of the airbag are folded over so far that their ends contact each other.

3. The method according to claim 1, wherein the gas generator and/or the airbag-retaining metal sheet is/are positioned in the airbag so that transversely to the longitudinal extension of the elongate folded airbag folds extend on opposite circumferential sides of the gas generator and/or of the airbag-retaining metal sheet along the gas generator and/or along the airbag-retaining metal sheet.

4. The method according to claim 1, wherein the airbag is thermally heated and/or compressed for forming the folding.

5. The method according to claim 1, wherein the folds are laid along the outer circumference of the gas generator.

6. The method according to claim 1, wherein the airbag when folded is accommodated in a cup-shaped module casing.

7. The method according to claim 6, wherein the folded portions of the airbag extend in a peripheral gap between the outer circumferential wall of the module casing and the outer circumference of the gas generator and/or that at least a part of an end face of the gas generator facing in the deployment direction is covered by only one airbag layer.

8. The method according to claim 1, wherein folds of the airbag are formed in upper and lower airbag portions.

9. The method according to claim 8, wherein folds of at least one of the upper and lower airbag portions have a forward roll-folded configuration.

10. The method according to claim 8, wherein folds of at least one of the upper and lower airbag portions have a rearward roll-folded configuration.

11. The method according to claim 8, wherein one of the upper and lower airbag portions has a zigzag folded configuration and the other of the upper and lower airbag portions has a roll-folded configuration.

12. The method according to claim 8, wherein one of the upper and lower airbag portions has a forward roll-folded configuration and the other of the upper and lower airbag portions has a rearward roll-folded configuration.

13. An airbag module comprising a gas generator and an airbag in which the gas generator is located, wherein the airbag is laid into plural folds, at least a portion of which are roll-folded, extending in parallel to each other so as to form an elongate package in an intermediate state, wherein the gas generator, related to the length of the parallel folds, is positioned in the central third in the airbag, and wherein the outer thirds form airbag end portions of the airbag being folded into at least two parts, wherein two internal parts extend along the outer circumference of the gas generator toward each other up to a folding zone and wherein a respective external part of each airbag end portion is folded over outwards starting from the folding zone and extends along its associated internal part in the opposite direction.

14. The airbag module according to claim 13, wherein the end portions of the airbag contact each other in the folding zone and/or with their ends.

15. The airbag module according to claim 13, wherein the folds extend along the outer circumference of the gas generator and/or wherein the central third of the airbag includes folds which extend along opposite circumferential sides of the gas generator.

16. The airbag module according to claim 13, wherein the plural folds of the airbag are formed in upper and lower airbag portions.

17. The airbag module according to claim 16, wherein folds of at least one of the upper and lower airbag portions have a forward roll-folded configuration.

18. The airbag module according to claim 16, wherein folds of at least one of the upper and lower airbag portions have a rearward roll-folded configuration.

19. The airbag module according to claim 16, wherein one of the upper and lower airbag portions has a zigzag folded configuration and the other of the upper and lower airbag portions has a roll-folded configuration.

20. The airbag module according to claim 16, wherein one of the upper and lower airbag portions has a forward roll-folded configuration and the other of the upper and lower airbag portions has a rearward roll-folded configuration.

21. A steering wheel module comprising the airbag module according to claim 13.

* * * * *